US009105967B2

(12) United States Patent
Park

(10) Patent No.: US 9,105,967 B2
(45) Date of Patent: Aug. 11, 2015

(54) MOBILE TERMINAL

(71) Applicant: LG ELECTRONICS INC., Seoul (KR)

(72) Inventor: Kyungsoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 13/728,942

(22) Filed: Dec. 27, 2012

(65) Prior Publication Data
US 2013/0176179 A1 Jul. 11, 2013

(30) Foreign Application Priority Data
Jan. 10, 2012 (KR) .................. 10-2012-0003105

(51) Int. Cl.
*H01Q 1/24* (2006.01)
*H01Q 7/00* (2006.01)
*H02J 7/00* (2006.01)
*H02J 7/02* (2006.01)

(52) U.S. Cl.
CPC ................. *H01Q 1/243* (2013.01); *H01Q 7/00* (2013.01); *H02J 7/0045* (2013.01); *H02J 7/025* (2013.01)

(58) Field of Classification Search
CPC .................................. H01Q 1/243; H01Q 7/00
USPC ........................ 343/702, 741, 742, 866, 895
See application file for complete search history.

(56) References Cited

U.S. PATENT DOCUMENTS

| 6,496,382 B1* | 12/2002 | Ferguson et al. | 361/767 |
| 7,859,480 B2* | 12/2010 | Shimizu | 343/895 |
| 2007/0095913 A1 | 5/2007 | Takahashi et al. | |
| 2008/0055046 A1 | 3/2008 | Shimizu | |
| 2008/0117027 A1* | 5/2008 | Tsirline et al. | 340/10.6 |
| 2012/0162028 A1* | 6/2012 | Kubo et al. | 343/702 |

FOREIGN PATENT DOCUMENTS

| CN | 1577965 | 2/2005 |
| CN | 101304184 | 11/2008 |
| CN | 102244991 | 11/2011 |
| CN | 102263425 | 11/2011 |
| EP | 2386401 | 11/2011 |
| JP | 11-332135 | 11/1999 |
| JP | 2008206297 | 9/2008 |
| WO | 2011/093151 | 8/2011 |

OTHER PUBLICATIONS

European Patent Office Application Serial No. 12198400.9, Search Report dated Oct. 21, 2013, 6 pages.
The State Intellectual Property Office of the People's Republic of China Application Serial No. 201210570748.6, Office Action dated Jul. 28, 2014, 8 pages.

* cited by examiner

*Primary Examiner* — Hoang V Nguyen
(74) *Attorney, Agent, or Firm* — Lee, Hong, Degerman, Kang & Waimey

(57) ABSTRACT

A mobile terminal including a case that forms at least a portion of a terminal body of the mobile terminal. The case may include a case body, a different material portion attached to the case body and composed of a plateable material that is different from a material composing the case body, and an antenna coil formed on the different material portion via plating and configured to detect a change in magnetic flux occurring at a periphery of the terminal body.

16 Claims, 8 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0003105, filed on Jan. 10, 2012, the content of which is incorporated by reference herein in its entirety.

BACKGROUND OF THE INVENTION

1. Field of the Invention

The present disclosure relates to a mobile terminal capable of performing near-field communication and wireless charging.

2. Background of the Invention

A mobile terminal can support complicated functions such as capturing images or video, reproducing music or video files, playing games, receiving broadcast signals, and other similar functions. The mobile terminal may be a multimedia player or any other similar device. There currently exists a need for a mobile terminal that is both small in size and capable of implementing near-field communication and wireless charging.

SUMMARY OF THE INVENTION

An objective of the present invention is to provide a mobile terminal that is both small in size and capable of implementing near-field communication and/or wireless charging.

The mobile terminal comprises a case that forms at least a part of an appearance of a terminal body, wherein the case comprises a case body composed of a particular material; a different material portion attached to the case body and formed from a plateable material that is different from the particular material of the case body; and an antenna coil formed at the different material portion via plating and configured to detect a change in magnetic flux occurring at a periphery of the terminal body.

Grooves corresponding to the antenna coil may be provided in different patterns at different portions of the mobile terminal. The antenna coil may be plated at the grooves. The patterns of the grooves may be formed via a laser processing method. A recess region may be formed on a surface of the case body. Different materials may be configured to fill the recess region such that the grooves are arranged on an outwardly-exposed surface of the recess region.

The mobile terminal may comprise a wireless charging coil located on parts covered by the antenna coil and configured to generate an induction current for wireless charging.

The mobile terminal may comprise a single ferrite sheet comprising that is mounted on the case of the mobile terminal in order to cover the antenna coil and wireless charging coil.

The mobile terminal may comprise grooves corresponding to the wireless charging coil. The wireless charging coil may be plated at the grooves. The grooves corresponding to the wireless charging coil and the antenna coil may be formed on the same plane but at different portions of the mobile terminal.

The wireless charging coil may be located on a flexible printed circuit board (FPCB), and the FPCB may be located in different portions of the mobile terminal. The FPCB may comprise a plurality of layers. The wireless charging coil may be formed on each of the plurality of layers of the FPCB such that the wireless charging coil and FPCB are laminated together. The case body of the mobile terminal and the FPCB may be integrated with different portions of the mobile terminal via an insert-molding integration process.

The wireless charging coil may comprise a wire, and at least a part of the wire may be located in different portions of the mobile terminal.

The mobile terminal may comprise a battery accommodation portion configured to accommodate a battery. A case may be mounted on a terminal body of the mobile terminal. The case may serve as a battery cover for covering the battery and/or the battery accommodation portion. A different materials portion may be mounted on one surface of the battery cover facing the battery cover. The different materials portion may be exposed on one side.

In another embodiment of the present invention, the mobile terminal comprises a terminal body; a flexible printed circuit board (FPCB) having a first region and a second region; an antenna coil formed at the first region and configured to detect a change in the magnetic flux change occurring at a periphery of the terminal body; a wireless charging coil formed at the second region and configured to generate an induction current for wireless charging; and a case that forms at least a part of an appearance of the terminal body, wherein the FPCB is inserted into the case.

The FPCB may comprise a plurality of layers, and the antenna coil may be formed on one of the plurality of layers. The wireless charging coil may be formed on at least two layers of the plurality of layers of the FPCB. One layer of the plurality of layers of the FPCB may be formed on an external surface of the FPCB. A recessed region for inserting the FPCB may be formed at the case.

Additional descriptions of the present invention are provided below. However, it will be understood that the descriptions and examples provided herein are provided for illustration purposes. It will be understood by one of ordinary skill in the art that various changes and modifications of the detailed descriptions provided herein are within the spirit and scope of the present invention.

BRIEF DESCRIPTION OF THE DRAWINGS

The accompanying drawings are incorporated in and constitute a part of the specification, illustrate exemplary embodiments, and explain some of the principles of the present invention.

DETAILED DESCRIPTION OF THE INVENTION

Detailed description will be provided below regarding some exemplary embodiments of the present invention with reference to accompanying drawings.

In some embodiments of the present invention, a mobile terminal may include a portable phone, a smart phone, a laptop computer, a tablet computer, a digital broadcasting terminal, Personal Digital Assistants (PDA), Portable Multimedia Player (PMP), a navigation system or other similar device.

Figure 1:
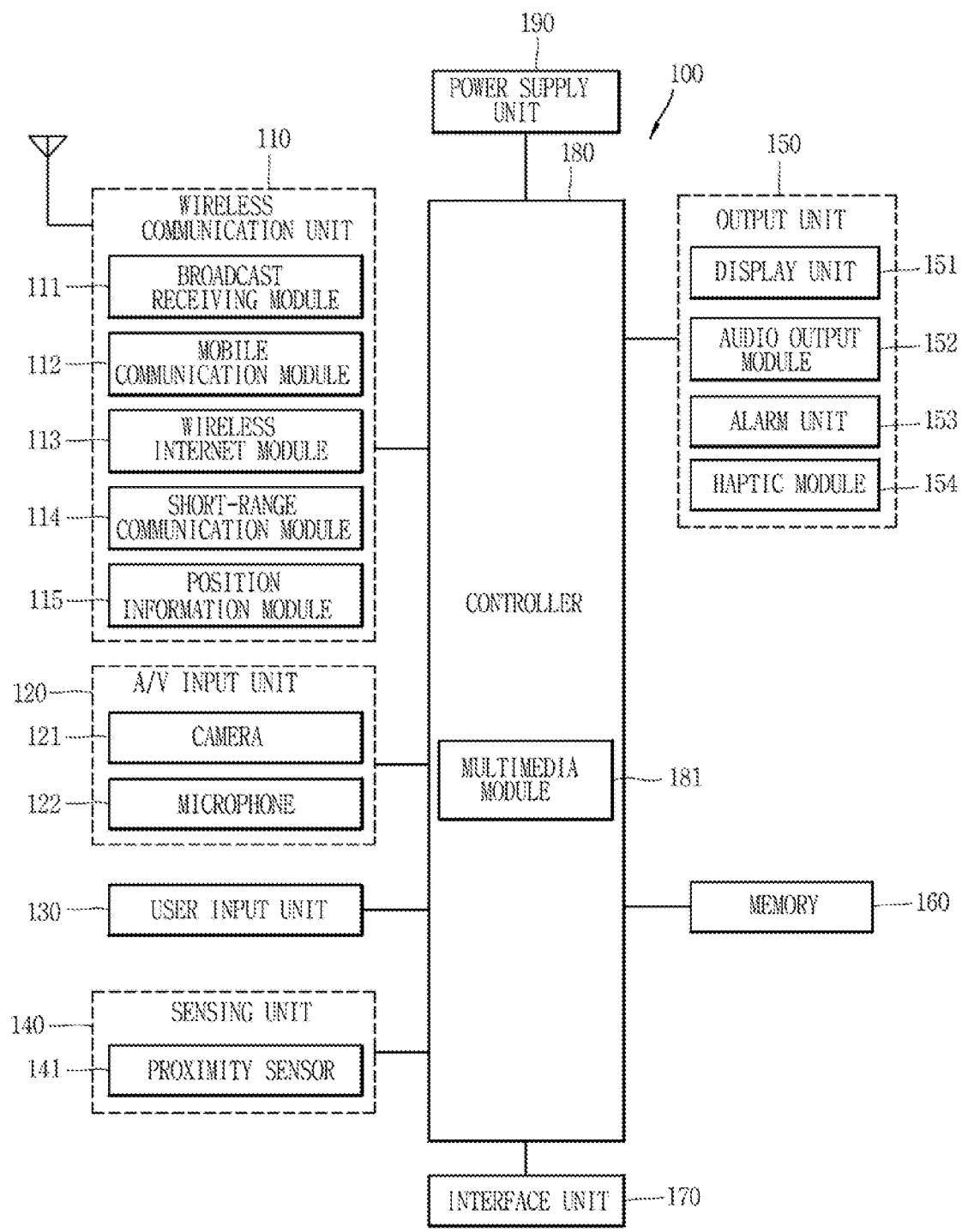
FIG. 1 is a block diagram of an exemplary mobile terminal according to an embodiment of the present invention.

FIG. 1 is a block diagram of an exemplary mobile terminal 100 according to an embodiment of the present invention.

The mobile terminal 100 may comprise components such as a wireless communication unit 110, an Audio/Video (NV) input unit 120, a user input unit 130, a sensing unit 140, an output unit 150, a memory 160, an interface unit 170, a controller 180, a power supply unit 190, and other similar components. Although FIG. 1 shows mobile terminal as including the aforementioned components, it will be understood by one of ordinary skill in the art that implementing all of the illustrated components is not required. Greater or fewer numbers of components may contained in alternative embodiments of the present invention.

The wireless communication unit 110 may include one or more components which permit wireless communications between the mobile terminal 100 and a wireless communication system (not shown) or between the mobile terminal and a network (not shown). For example, the wireless communication unit may include a broadcast receiving module 111, a mobile communication module 112, a wireless Internet module 113, a short-range communication module 114, a position information module 115 and other similar components.

The broadcast receiving module 111 may receive broadcast signals and/or broadcast associated information from an external broadcast management server (not shown) via a broadcast channel. The broadcast channel may include a satellite channel and/or a terrestrial channel. The broadcast management server may be a server that generates and/or transmits a broadcast signal and/or broadcast associated information. The broadcast management server may receive a previously-generated broadcast signal and/or broadcast associated information and transmit the previously-generated broadcast signal and/or broadcast associated information to a terminal.

The broadcast associated information may comprise information associated with a broadcast channel, a broadcast program or a broadcast service provider. The broadcast signal may include a television (TV) broadcast signal, a radio broadcast signal, a data broadcast signal, and other similar signals. The broadcast signal may also include a broadcast signal combined with a TV or radio broadcast signal. The broadcast associated information may be provided via a mobile communication network (not shown), and the broadcast associated information may be received via the mobile communication module 112.

The broadcast signal may exist in various forms. For example, the broadcast signal may exist in the form of an electronic program guide (EPG) of digital multimedia broadcasting (DMB), electronic service guide (ESG) of digital video broadcast-handheld (DVB-H), and other similar signal forms.

The broadcast receiving module 111 may be configured to receive signals that are broadcast using various types of broadcast systems (not shown). In particular, the broadcast receiving module may receive a digital broadcast using a digital broadcast system such as a multimedia broadcasting-terrestrial (DMB-T) system, a digital multimedia broadcasting-satellite (DMB-S) system, a digital video broadcast-handheld (DVB-H) system, a media forward link only (MediaFLO®) system, an integrated services digital broadcast-terrestrial (ISDB-T) system, and other similar systems. The broadcast receiving module may be suitable for other broadcast systems that provide a broadcast signal. Broadcasting signals and/or broadcasting associated information received via the broadcast receiving module 111 may be stored in the memory 160.

The mobile communication module 112 may transmit and/or receive wireless signals to/from at least one of a plurality of network entities (e.g., a base station, an external terminal, or a server) via a mobile communication network (not shown). The wireless signals may include an audio call signal, a video call signal, or various formats of data according to transmission and/or reception of text and/or multimedia messages.

The wireless Internet module 113 supports wireless Internet access for the mobile terminal 100. The wireless Internet module may be internally or externally coupled to the mobile terminal. Examples of wireless Internet access may include Wireless Local Area Network (WLAN), Wireless Fidelity (Wi-Fi), Wireless Broadband (Wibro), World Interoperability for Microwave Access (Wimax), High Speed Downlink Packet Access (HSDPA), and other similar forms of wireless Internet access.

The short-range communication module 114 is a module used in short-range communications. Suitable technologies for implementing the short-range communication module may include BLUETOOTH™, Radio Frequency Identification (RFID), Infrared Data Association (IrDA), Ultra-WideBand (UWB), ZigBee, and other similar technologies.

The position information module 115 is a module for sensing or calculating a position of the mobile terminal 100. An example of the position information module may include a Global Position System (GPS) module.

The A/V input unit 120 is configured to receive an audio or video signal. The A/V input unit may include a camera 121, a microphone 122 and other similar components. The camera may process image data of still pictures and/or video acquired via an image capture device that is in a video capturing mode or an image capturing mode. The processed image frames may be displayed on a display unit 151.

The image frames processed by the camera 121 may also be stored in the memory 160 or transmitted elsewhere via the wireless communication unit 110. In some embodiments of the present invention, the mobile terminal 100 may comprise two or more cameras.

The microphone 122 may receive sounds (i.e., audible data) during a phone call mode, a recording mode, a voice recognition mode, and other similar modes. The microphone may also process such sounds into audio data. The processed audio data may be converted into a format that is output and transmittable to a mobile communication base station (not shown) via the mobile communication module 112 during the phone call mode. The microphone may implement various types of noise canceling or suppression algorithms to cancel or suppress noise or interference generated in the course of receiving and transmitting audio signals.

The user input unit 130 may generate key input data from commands entered by a user to control various operations of the mobile terminal 100. The user input unit may include a keypad, a dome switch, a touch pad (i.e., a touch-sensitive member that detects changes in resistance, pressure, capacitance, or other similar electrical characteristics when contacted), a jog wheel, a jog switch, and other similar components.

The sensing unit 140 detects a current status or state of the mobile terminal 100. For example, the sensing unit may detect: whether the mobile terminal is in an opened or closed state; a location of the mobile terminal; the presence or absence of user contact with the mobile terminal; the orientation of the mobile terminal; an acceleration or deceleration of the movement of the mobile terminal; a direction of movement of the mobile terminal; and other similar characteristics. The sensing unit may include a proximity sensor 141.

The sensing unit may also generate commands or signals for controlling the operation of the mobile terminal. For example, when the mobile terminal is a slide-type mobile phone, the sensing unit may sense whether the slide-type phone is in an opened or closed state. In addition, the sensing unit may detect whether the power supply unit 190 is supplying power to the mobile terminal. The sensing unit may also detect whether the interface unit 170 is coupled to an external device (not shown).

The output unit 150 is configured to provide outputs in a visual, audible, and/or tactile manner. The output unit may include the display unit 151, an audio output module 152, an alarm unit 153, a haptic module 154, and other similar components.

The display unit 151 may display information processed by the mobile terminal 100. For example, when the mobile terminal is in a phone call mode, the display unit may display a User Interface (UI) or a Graphic User Interface (GUI) associated with a call or other type of communication (e.g., sending or receiving text messages and multimedia files). When the mobile terminal is in a video call mode or image capturing mode, the display unit may display a captured image, a received image, a UI or GUI that shows videos and/or images, functions related to images and/or videos, and other similar items.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or other similar types of displays. In some embodiments of the present invention, some of these displays may be transparent displays. An example of a transparent display is a Transparent Organic Light Emitting Diode (TOLED) display.

The rear surface portion of the display unit 151 may also be optically transparent. As such, in some embodiments of the present invention, a user can view an object positioned behind the mobile terminal 100 by looking through the transparent display(s) of the mobile terminal.

In some embodiments of the present invention, the mobile terminal 100 may comprise two or more display units 151. For example, a plurality of display units may be arranged on one surface, either together or separately. Alternatively, the plurality of display units may be arranged on different surfaces of the mobile terminal.

The display unit 151 and a touch sensitive sensor (not shown) may have a layered structure (not shown) between them. This layered structure may be referred to as a touch screen. In some embodiments of the present invention, the display unit may be an input device rather than an output device. The touch sensor may be implemented as a touch film, a touch sheet, a touch pad, or any other similar component.

The touch sensor (not shown) may convert changes in pressure applied to a specific part of the display unit 151, or changes in capacitance from a specific part of the display unit, into electric input signals. Also, the touch sensor may sense a touched position, a touched area, and/or a touch pressure applied to the specific part of the display unit.

When touch inputs are detected by the touch sensors, corresponding signals are transmitted to a touch controller (not shown). The touch controller processes the corresponding signals and subsequently transmits corresponding data to the controller 180. Accordingly, the controller may detect a region of the display unit 151 where the touch occurred.

A proximity sensor 141 may be located at an inner region of the mobile terminal 100 and blocked by or near the touch screen. The proximity sensor comprises a sensor that senses an object approaching a surface of the mobile terminal 100. The proximity sensor may also sense an object near the surface of the mobile terminal without requiring mechanical contact and, instead, use an electromagnetic field and/or infrared rays. The proximity sensor typically has a longer lifespan and more utility than a contact-based sensor (not shown).

The proximity sensor 141 may include a transmission-type photoelectric sensor, a direct reflective-type photoelectric sensor, a mirror reflective-type photoelectric sensor, a high-frequency oscillation-type proximity sensor, a capacitance-type proximity sensor, a magnetic-type proximity sensor, an infrared ray-type proximity sensor, and other similar types of sensors. When the touch screen is configured to detect changes in capacitance, a proximity of a pointer close to the touch screen is sensed by changes in an electromagnetic field.

Hereinafter, a pointer positioned proximate to the touch screen, without physical contact between the pointer and the touch screen, will be referred to as a 'proximity touch.' In contrast, the pointer substantially contacting the touch screen will be referred to as a 'contact touch.'

The proximity sensor 141 may be configured to sense a proximity touch and/or proximity touch patterns (e.g., a distance, a direction, a speed, a time, a position and/or a status of movement of the proximity touch). Information related to the sensed proximity touch and the sensed proximity touch patterns may be output onto the touch screen.

The audio output module 152 may store, convert and/or output data received from the wireless communication unit 110 as sound audio during a call signal reception mode, a call mode, a record mode, a voice recognition mode, and/or a broadcast reception mode. Also, the audio output module may provide audible output signals related to a particular function performed by the mobile terminal 100 (e.g., call signal reception, message reception sound, or other similar events). The audio output module may include a speaker (not shown), a buzzer (not shown), and other similar components.

The alarm unit 153 may provide output signals to inform a user of the mobile terminal 100 about the occurrence of an event. Such events may include call reception, message reception, key signal inputs, a touch input, and other similar events. The alarm unit may also output video signals. In embodiments of the present invention where the alarm unit outputs video signals, the display unit 151 or the audio output module 152 may be considered as a part of the alarm unit.

The haptic module 154 generates various tactile effects which the user of the mobile terminal can feel through a physical sensation. An example of a tactile effect generated by the haptic module is vibration. Vibration generated by the haptic module may have a controllable intensity, a controllable pattern, and other controllable characteristics. For instance, different vibrations may be output by the haptic module in a continuous manner or a discontinuous manner.

The haptic module 154 is not limited to generation of only vibration. The haptic module may also generate an effect such as an arrangement of pins moving vertically with respect to the user's skin, air injection via an injection hole (not shown), air suction via a suction hole (not shown), gentle electrical stimulation via an electrode (not shown) or electrostatic force, a feeling of cold via a heat absorbing device (not shown), a feeling of heat via a heat emitting device (not shown), and other similar effects. In some embodiments of the present invention, the mobile terminal 100 may comprise two or more haptic modules.

The memory 160 may store a program to be processed by the controller 180. The memory may temporarily store input and/or output data (e.g., phonebook data, messages, still images, video and other similar data). The memory may store data related to various patterns of vibrations and audio output based on the touch input received on the touch screen.

The memory 160 may be comprised of any suitable storage medium, including (but not limited to) a flash memory-type storage medium, a hard disk-type storage medium, a multimedia card micro-type storage medium, a memory card-type storage medium, a Random Access Memory (RAM), a Static Random Access Memory (SRAM), a Read-Only Memory (ROM), an Electrically Erasable Programmable Read-only Memory (EEPROM), a Programmable Read-only Memory (PROM), a magnetic memory, a magnetic disk, an optical disk, and other similar types of storage medium. Also, the mobile terminal 100 may operate a web storage that performs the storage function of the memory via the Internet.

The interface unit 170 may allow the mobile terminal 100 to interface an external device (not shown). The interface unit may facilitate data reception from an external device, power-delivery components of the mobile terminal, and/or data transmission between the mobile terminal and the external device. The interface unit may include, for example, wired and/or wireless headset ports, external charger ports, wired and/or wireless data ports, memory card ports, ports for coupling devices having an identification module, audio Input/Output (I/O) ports, video I/O ports, earphone ports, and other similar components.

The identification module may be configured as a chip for storing information required to authenticate a particular user to use the mobile terminal 100. The identification module may include a User Identity Module (UIM), a Subscriber Identity Module (SIM), a Universal Subscriber Identity Module (USIM), and other similar modules. Also, the device having the identification module may be a type of smart card that may be coupled to the mobile terminal 100 via a port (not shown).

The interface unit 170 may provide a path for power to be supplied from an external cradle (not shown) to the mobile terminal 100 when the mobile terminal is connected to the external cradle. The interface unit may also provide a path for providing command signals input by a user and transferred to the mobile terminal via the external cradle.

The controller 180 typically controls the overall operations of the mobile terminal 100. For example, the controller may process telephone calls, data communications, video calls, and other forms of communication. The controller may include a multimedia module 181, which provides multimedia playback. The multimedia module may be configured as part of the controller or as a separate component. The controller may perform pattern recognition of a writing or a drawing that is input via the touch screen in order to recognize the writing as text or the drawing as an image.

The power supply unit 190 supplies power to components of the mobile terminal 100.

Various embodiments described herein may be implemented in a computer-readable medium using, for example, software, hardware, or some combination of software and hardware.

For a hardware implementation of the present invention, the embodiments described herein may be implemented within at least Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, or any other electronic unit designed to perform the functions described herein.

For software implementation of the present invention, the embodiments of procedures and functions described herein may be implemented via separate software modules, each of which performs at least one of those functions and/or operations. Corresponding software codes may be implemented with a software application written in any suitable programming language. The software codes may be stored in the memory 160 and executed by the controller 180.

Figure 2A:
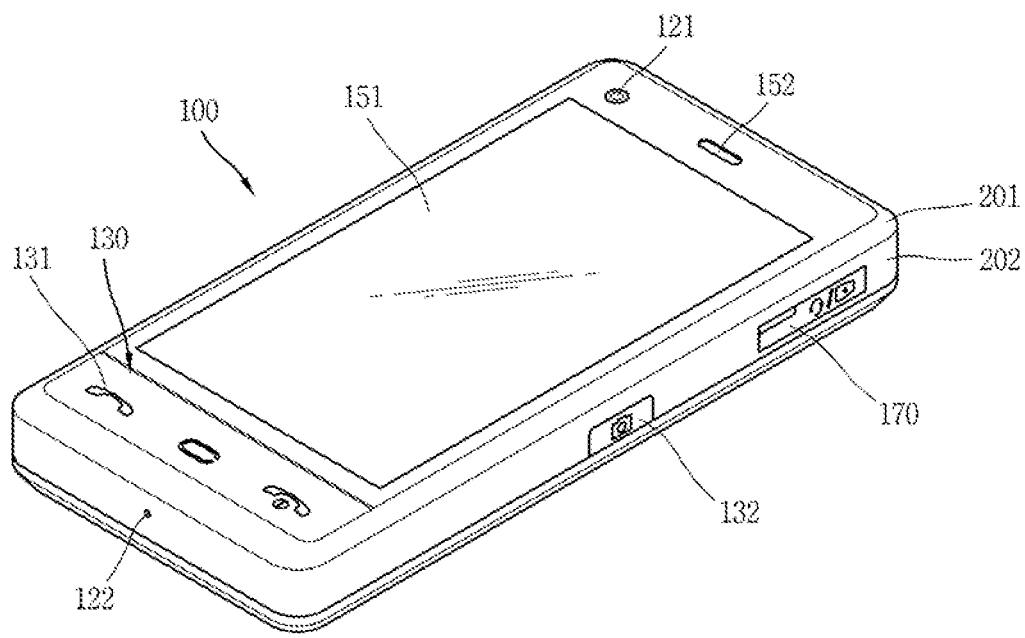
FIG. 2A is a front perspective view of an exemplary embodiment of the mobile terminal of the present invention.
Figure 2B:
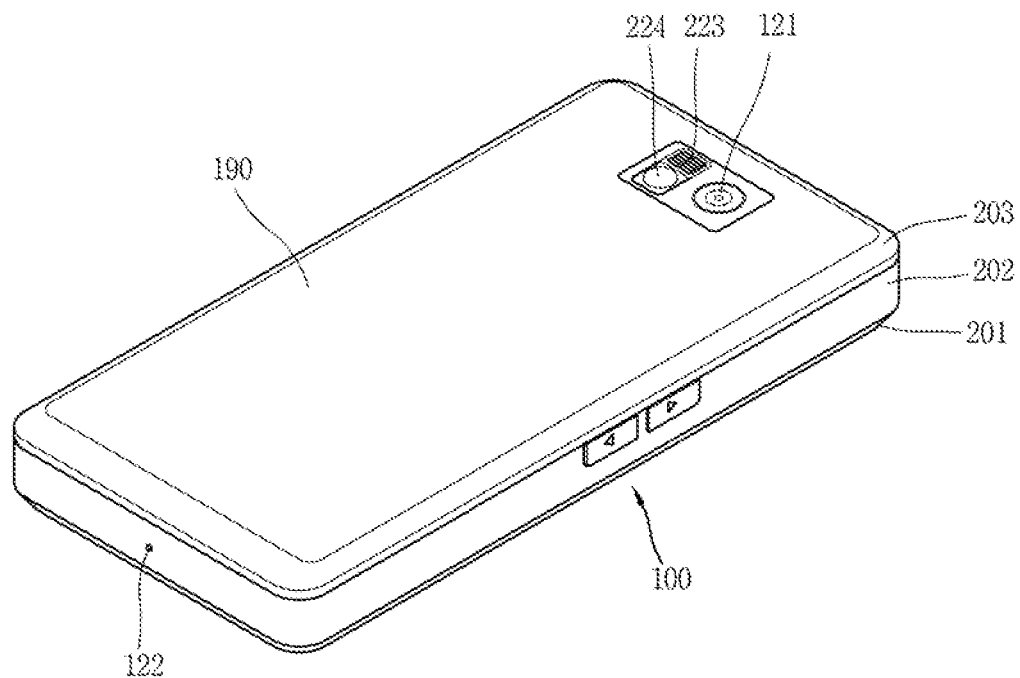
FIG. 2B is a rear perspective view of the exemplary embodiment of the mobile terminal shown in FIG. 2A.

FIG. 2A is a front perspective view of an exemplary embodiment of the mobile terminal of the present invention. FIG. 2B is a rear perspective view of the exemplary embodiment of the mobile terminal shown in FIG. 2A.

One embodiment of the mobile terminal 100 is a bar-type mobile terminal. However, the present disclosure is not limited to this type. For example, the present disclosure may be applied to a slide-type mobile terminal in which two or more bodies of the mobile terminal are coupled to each other and move relative to each other. The present disclosure may also be applied to a folder-type mobile terminal, a swing-type mobile terminal, a swivel-type mobile terminal and other similar types of mobile terminals.

A case (e.g., a casing, a housing, or a cover) forming the exterior appearance of a body of the mobile terminal 100 may include a front case 201 and a rear case 202. A space formed by the front case and the rear case may accommodate various components between them. At least one intermediate case (not shown) may be located between the front case and the rear case.

The aforementioned cases may be created using injection-molded synthetic resin and/or metallic materials, such as stainless steel (STS) or titanium (Ti).

The front case 201 may comprise the display module 151, the audio output unit 252, the camera 121, user input unit 130, the microphone 122, the interface unit 170, as well as other components.

The display module 151 occupies a substantial part of a main surface of the front case 201. The audio output unit 152 and the camera 121 may be arranged at a region that is close to one end of the display module. The user input unit 130 and the microphone 122 may be arranged at a region close to another end of the display module.

The user input unit 130 may be manipulated by the user of the mobile terminal 100. The user input unit may comprise at least two user manipulation units 131, 132. The manipulation units may be manipulated by a user's input. One of the user manipulation units 132, the interface unit 170, as well as some other components of the mobile terminal 100, may be disposed on side surfaces of the front case 201 and the rear case 202, as shown in FIG. 1.

Each of the user manipulation units 131, 132 may be set to perform various functions. For example, a first manipulation input unit 131 may be configured to input commands corresponding to 'START,' 'END,' 'SCROLL' or other similar commands. Also, for example, a second user manipulation unit 132 may be configured to input commands to control a level of sound output from the audio output unit 152, or, alternatively, to input commands to set a mode of the display module to a touch recognition mode.

The display module 151 may form a touch screen with a touch sensor (not shown). In some embodiments of the present invention, an example of the user input unit 130 may be the touch screen of the mobile terminal 100.

Referring to FIG. 2B, a rear camera 121' may be located on the rear case 202. The rear camera faces a direction that is opposite to a direction faced by the camera 121 (see FIG. 2A). The rear camera may be configured to capture images or videos with a different number of pixels than those captured by the camera. The camera and rear camera may be located on the body of the mobile terminal 100 and be configured to rotate or pop-up.

For example, the camera 121 may operate with a fewer number of pixels (i.e., a lower resolution) than the rear camera 121' (which may have a relatively higher resolution). In such embodiments of the present invention, the camera may be better suited to capture and transmit an image or video of the user's face during a telephone or video call. In such embodiments of the present invention, the rear camera may be better suited to obtain higher quality pictures and store them in the memory 160.

A flash 223 and a mirror 224 may be located near the rear camera 121'. The flash may operate in conjunction with the rear camera when the rear camera captures a picture or video. The mirror can be used in conjunction with the rear camera to allow a user to photograph himself or herself when the mobile terminal 100 is in a self-portrait mode.

A rear audio output unit (not shown) may be located on a rear surface of the body of the mobile terminal 100. The rear audio output unit may implement a stereo function or may be configured to operate as a speakerphone during a telephone or video call in conjunction with the audio output 152.

The power supply unit 190 may be mounted on, mounted in, or detachably mounted on the body of the mobile terminal.

A touch sensor (not shown) for sensing a touch may be mounted on the rear case 202 of the mobile terminal 100. The touch sensor may allow light to transmit through it. Information output from the display module 151 may be controlled via the touch sensor. In some embodiments of the claimed invention, a display may be mounted on the touch sensor and a touch screen may be located on the rear case.

The touch sensor (not shown) may be configured to operate in association with the display module 151. The touch sensor may be parallel to and located on the rear surface of the display module 151. The touch sensor may have a size that is equal to or less than a size of the display module 151.

The body of the mobile terminal 100 may comprise an antenna device 210 for calling as well as for receiving a broadcasting signal.

The mobile terminal 100 may comprise an antenna device (not shown) configured for implementing near-field communication and a charging device (not shown) configured for wireless charging. In some embodiments of the present invention, the mobile terminal may comprise only the antenna device or the charging device. The antenna device and charging device are explained in additional detail with reference to FIGS. 3 to 11.

Figure 3:
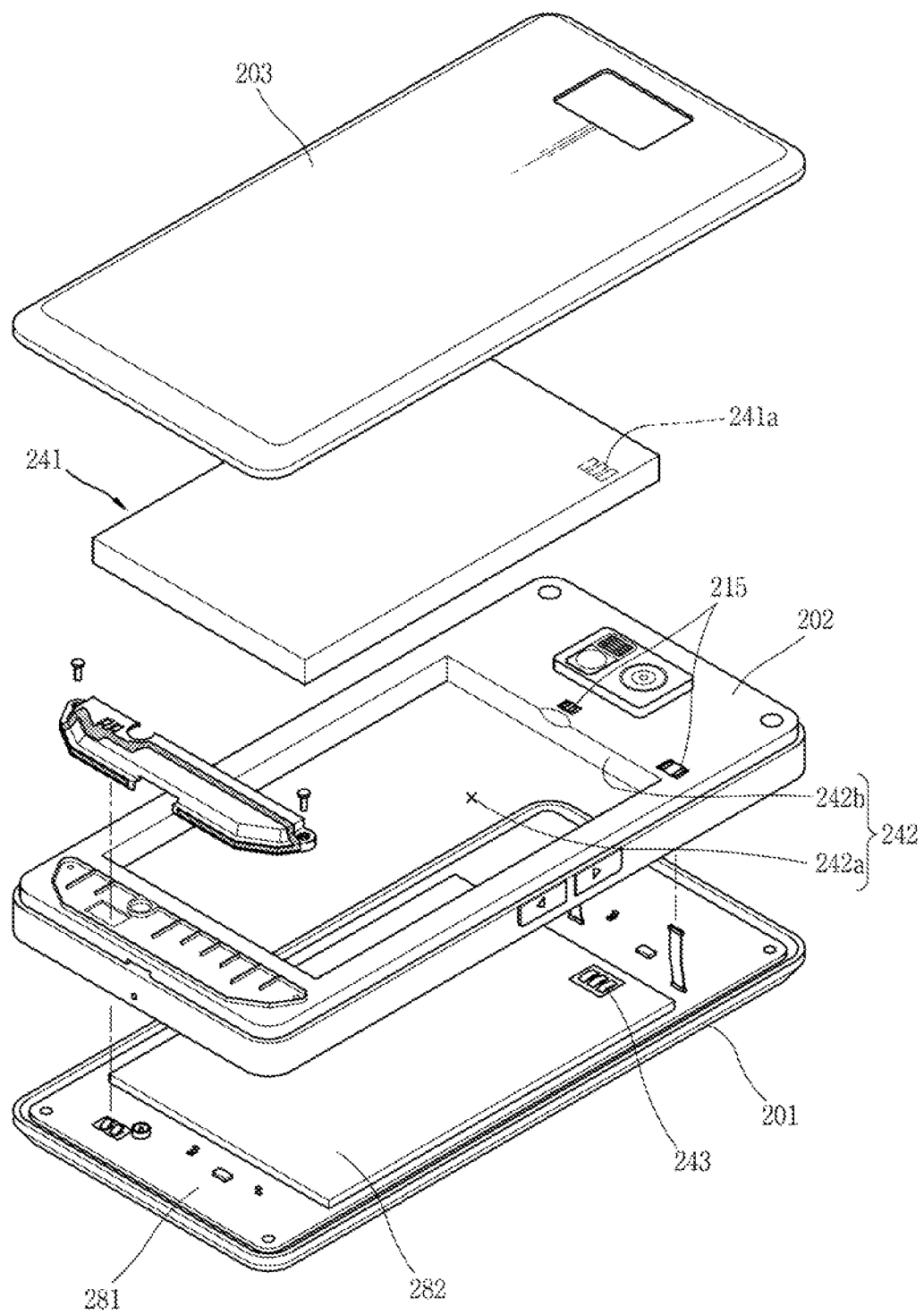
FIG. 3 is an exploded view of the exemplary embodiment of the mobile terminal shown in FIGS. 2A and 2B.

FIG. 3 is an exploded view of the exemplary embodiment of the mobile terminal shown in FIGS. 2A and 2B.

Figure 4:
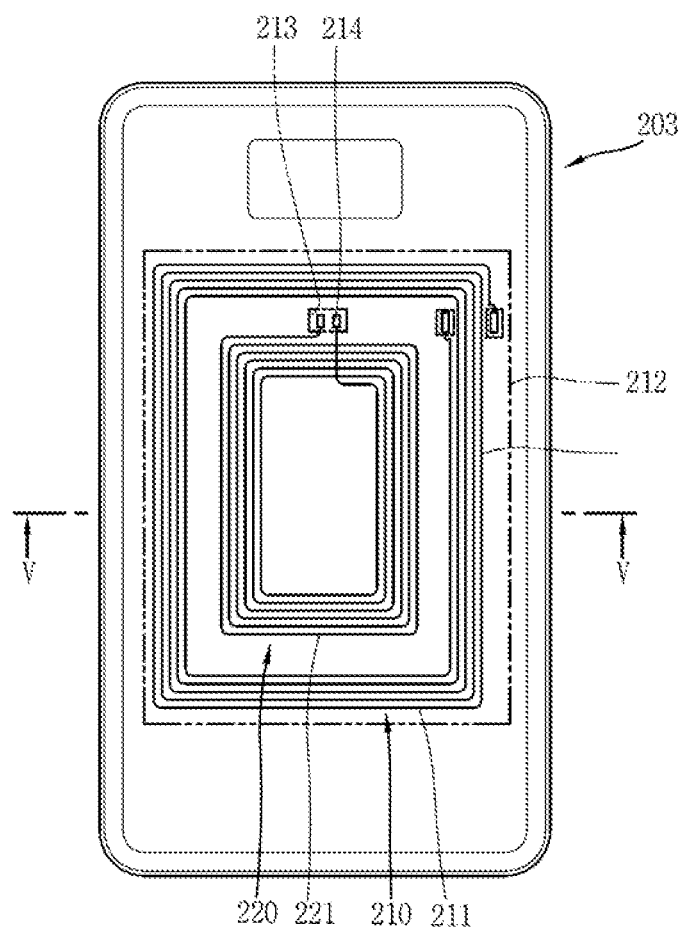
FIG. 4 is a perspective view of a rear surface of an exemplary embodiment of a battery cover of the mobile terminal shown in FIG. 3.

FIG. 4 is a perspective view of a rear surface of an exemplary embodiment of a battery cover of the mobile terminal shown in FIG. 3.

Figure 5:
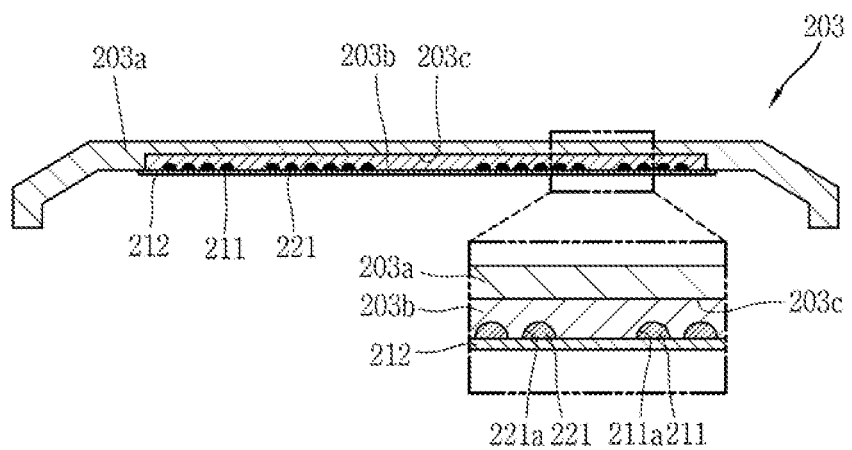
FIG. 5 is a sectional view of the exemplary embodiment of the battery cover shown in FIG. 4 as observed at line V-V.

FIG. 5 is a sectional view of the exemplary embodiment of the battery cover shown in FIG. 4 as observed from line V-V.

Figure 6:
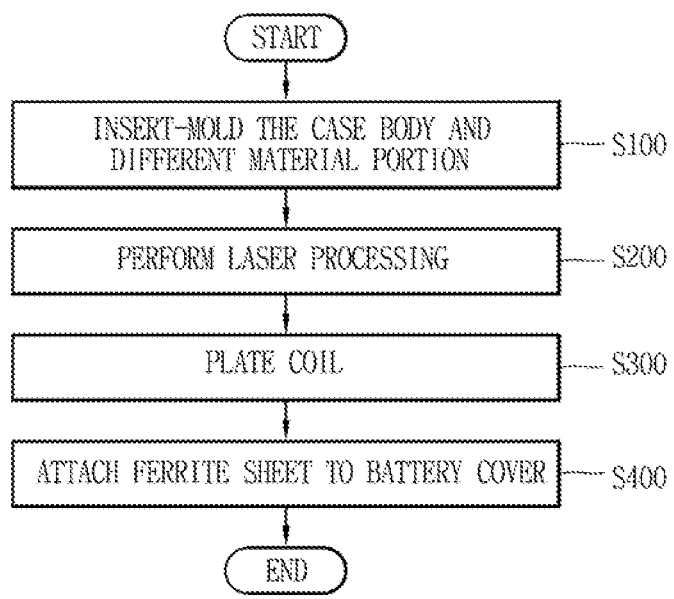
FIG. 6 is a flowchart showing an exemplary embodiment of a process for fabricating the battery cover shown in FIG. 3.

FIG. 6 is a flowchart showing an exemplary embodiment of a process for fabricating the battery cover shown in FIG. 3.

As shown in FIG. 3, a circuit board 281 may be mounted in the body of the mobile terminal 100. The circuit board may be mounted to the front case 201 or the rear case 202. The circuit board may, alternatively, be mounted to another internal structure not shown in the drawings. The circuit board may be covered by an inner surface of the rear case.

Various electronic devices may be mounted to at least one surface of the circuit board 281. A shield member 282 for protecting the electronic devices may be mounted on a surface of the circuit board. In some embodiments of the present invention, the shield member may be composed of a metallic plate.

In some embodiments of the claimed invention, the circuit board 281 may be configured as the controller 180 for purposes of operating the functions of the mobile terminal 100. In some embodiments of the claimed invention, the mobile terminal 100 may comprise a plurality of circuit boards that may perform some function of the controller.

A main antenna (not shown) configured to transmit and/or receive radio signals may be mounted to one end of the rear case 202. The main antenna may be electrically connected to the circuit board 281.

A battery accommodating unit 242 recessed to accommodate the battery 241 may be formed in the rear case 202. The battery accommodating unit may include a side wall portion 242a and a bottom portion 242b. The side wall portion may protrude from one surface of a structure mounted to the body of the mobile terminal 100, thereby defining an accommodation space of the battery accommodating unit.

The structure of the battery accommodating unit may be a frame or a case. In some embodiments of the present invention, the battery accommodating unit may be the rear case 202.

The bottom portion 242b may be formed to cross the side wall portion 242a such that the battery 241 can be mounted inside of the battery accommodation portion 242. However, the scope of the present invention is not limited to such exemplary embodiments. For example, the battery accommodating unit may be formed such that it comprises a closed (i.e., blocked) bottom portion. As another example, the battery and the battery accommodating unit may operate as the power supply unit 190.

A connection terminal 243 may electrically connect to an access terminal 241a of the battery 241. Once the battery is mounted on the bottom portion 242b, the connection terminal and the access terminal may come in contact with each other. In such embodiments, such an electrical connection allows for power to be supplied to the electronic devices of the mobile terminal 100.

A battery cover 203 may be configured to cover the battery 241 and the battery accommodating unit 242. In some embodiments of the present invention, the battery cover may be an example of the case forming the appearance of the body of the mobile terminal 100, and the battery cover may be configured to cover the entire rear surface of the mobile terminal.

Referring to FIGS. 4 and 5, an antenna device 210 for near-field communication may be mounted on the battery cover 203. The circuit board 281 may be electrically connected to the antenna device and may be configured to process radio signals transmitted and/or received by the antenna device.

In some embodiments of the present invention, a charging device (not shown) for performing wireless charging may be mounted on the battery cover 203. The charging device may be configured to generate an induction current for wireless charging. In some embodiments of the present invention, the antenna device 210 may include an antenna coil 211, and the charging device may include a wireless charging coil 221.

The present invention is not limited to a configuration where the antenna coil 211 and the wireless charging coil 221 are located on the battery cover 203. For example, the antenna coil and the wireless charging coil may be located at another portion of the case instead of the battery cover. In other embodiments of the present invention, the mobile terminal 100 includes only the antenna coil or the wireless charging coil.

In some embodiments of the present invention, the battery cover 203 includes a case body 203a and a different material portion 203b. The case body may form the appearance of the battery cover and may be composed of non-plateable synthetic resin. For example, the case body may be formed of polycarbonate (PC) material, acryl material, or other similar material.

The different material portion 203b may be attached to the case body 203a. More specifically, the different material portion may be integrally formed with the case body via insert-injection or in-mold injection methods. For instance, a recess region 203c may be formed on one surface of the case body, and the different material portion may be configured to fill the recess region.

In some embodiments of the present invention, the different material portion 203b may be composed of a different material than the material of the case body 203a. For example, the different material portion may be formed of a plateable material, such as a plateable synthetic resin (e.g., acrylonitrile butadiene styrene copolymer resin (ABS resin)), and the different material portion may be composed of urethane vinyl (UV).

Grooves 211a corresponding to the antenna coil 211 may be provided in a pattern shape, and the antenna coil 211 may be plated at the grooves 211a.

An exemplary process for fabricating a battery cover is provided. With respect to FIG. 6, the case body 203a and the different material portion 203b are integrated together via injection-molding (S100). Next, an antenna pattern is created on one surface of the different material portion via laser processing (S200). Subsequently, a battery cover is plated such that a coil is plated on the antenna pattern (S300). Afterwards, a ferrite sheet is attached to the battery cover (S400).

With respect to FIGS. 4 and 5, since the grooves 211a are disposed on one surface of the different material portion 203b, which is exposed to the outside of the mobile terminal 100, the antenna coil 211 is also exposed to the outside of the mobile terminal. In other words, the different material portion is mounted to one surface of the battery cover 203 facing the battery 241 and is exposed to the outside of the mobile terminal.

The antenna coil 211 may comprise an electron induction-type communication system configured for reading information by exchanging magnetic flux with a reader side antenna (not shown) The antenna coil which may form an antenna of a radio frequency identification (RFID) tag. However, the present invention is not limited to such exemplary embodiments. The antenna coil may be configured to transmit and/or receive radio signals with an antenna coil of another terminal (not shown).

The antenna coil 211 may be covered by a ferrite sheet 212. The ferrite sheet 212 may be configured to remove noise during detection of a change in magnetic flux. However, the present invention is not limited to such exemplary embodiments. In some embodiments of the present invention, the ferrite sheet may be formed by adding ferrite powder to the different material portion 203b.

In some embodiments of the present invention, an integrated circuit of the RFID tag (not shown) may be located on the circuit board 281. To facilitate an electrical connection between the integrated circuit and the antenna coil 211, an access terminal 214 may be formed at a part 213 where the antenna coil is not covered by the ferrite sheet 212. To facilitate a connection between the circuit board and the access terminal, a connection terminal 215 may connect to the access terminal and the circuit board 281.

Referring to FIGS. 3 through 5, the wireless charging coil 221 may be disposed at a part of the different material portion 203b that is covered by the antenna coil 211. An induction current generated from the wireless charging coil may be converted into a direct current via a direct current converter (not shown) and used to charge the battery 241.

Grooves 221a corresponding to the wireless charging coil 221 may be provided in a pattern on the different material portion 203b. The wireless charging coil 221 may be plated on the grooves.

The grooves 221a corresponding to the wireless charging coil 221 and the grooves 211a corresponding to the antenna coil 211 may be provided on the same plane of the different material portion 203b. In such embodiments of the present invention, single laser patterning may be performed by a laser irradiator (not shown) that moves along that plane of the different material portion.

The ferrite sheet 212 may be a single sheet that covers both the antenna coil 211 and the wireless charging coil 221. An area of the ferrite sheet may be maximized when the ferrite sheet is mounted on the battery cover, which can allow a magnetic field to be uniformly distributed while maintaining its high intensity.

Figure 7:
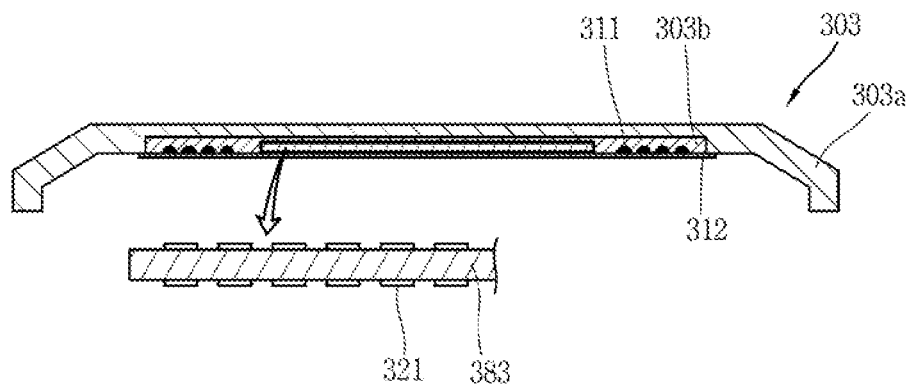
FIG. 7 is a sectional view of another exemplary embodiment of the battery cover.

FIG. 7 is a sectional view of another exemplary embodiment of the battery cover. A wireless charging coil 321 may be formed on a flexible printed circuit board (FPCB) 383. An antenna coil 311 may be plated on the surface of the different material portion, and the FPCB may be buried in the different material portion.

The antenna coil 311 may be plated via the same process as the fabrication process previously discussed with respect to FIG. 6. The FPCB 383 may be buried in the different material portion via an insert-molding process. After insert-molding is performed, the case body and the FPCB may be integrated with the different material portion.

In some embodiments of the present invention, the mobile terminal 100 may comprise a plurality of layers forming the FPCB 383, and the wireless charging coil 321 may be formed on each of those plurality of layers. The wireless charging coil may be formed on both surfaces of the FPCB and may be connected to the FPCB via holes (not shown).

In some embodiments of the present invention, the FPCB may be buried in the different material portion 303b in such a way that one surface of the FPCB is exposed to the outside portion of the mobile terminal. Accordingly, a part of the plurality of layers of the wireless charging coil 321 may be exposed to the outside portion of the mobile terminal 100, which may facilitate an electrical connection between the wireless charging coil and the circuit board 281.

Figure 8:
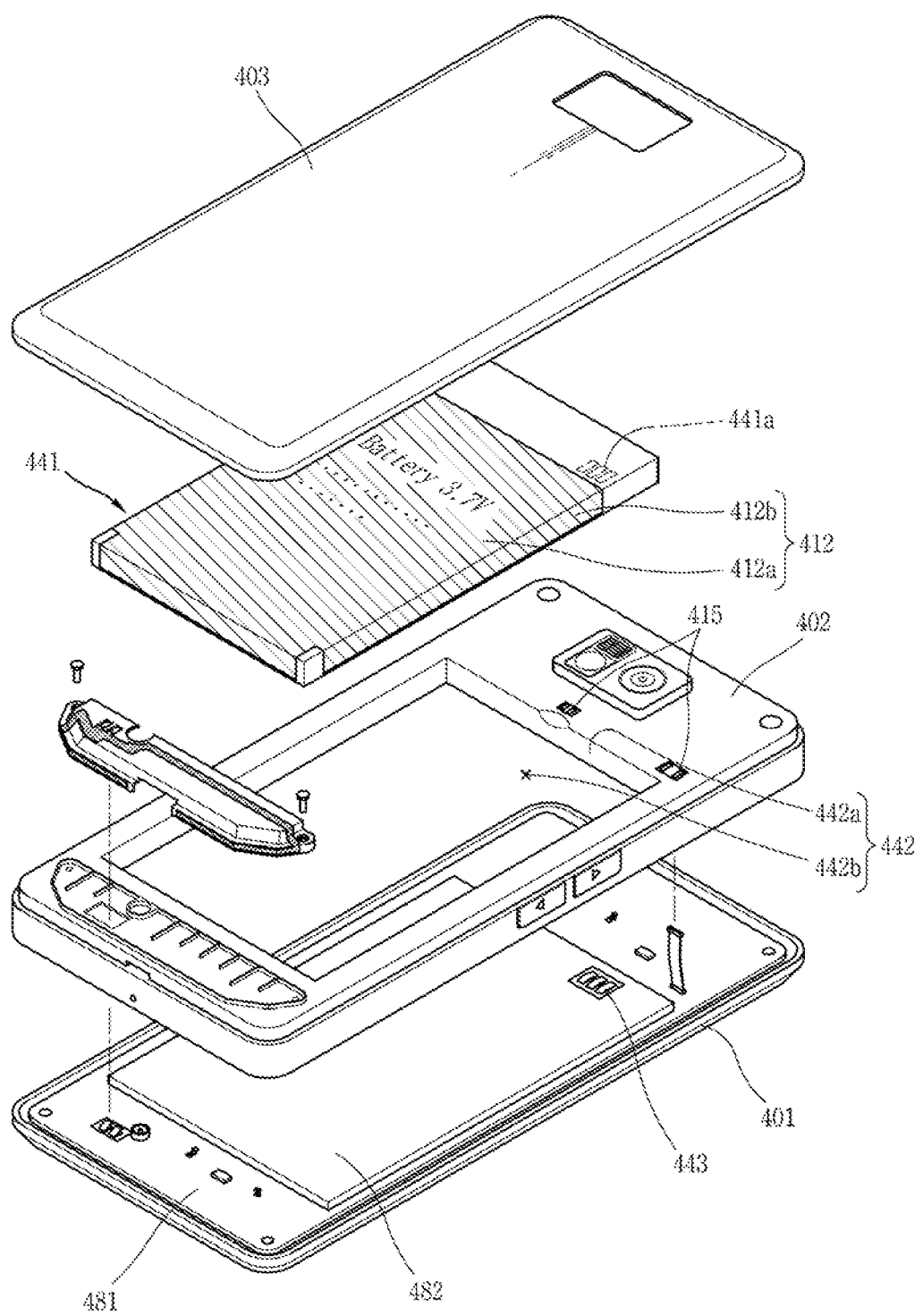
FIG. 8 is an exploded view of another exemplary embodiment of the mobile terminal.
Figure 9:
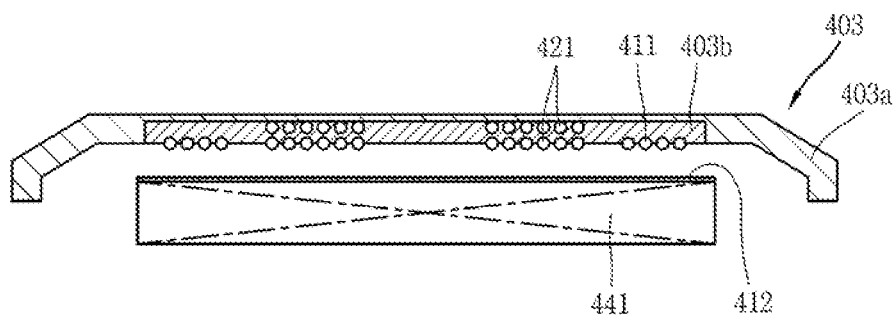
FIG. 9 is a sectional view of another exemplary embodiment of the battery cover.

FIG. 8 is an exploded view of another exemplary embodiment of the mobile terminal. FIG. 9 is a sectional view of another exemplary embodiment of the battery cover.

With respect to FIGS. 8 and 9, a wireless charging coil 421 may be composed of a wire. At least part of the wire is provided in and/or laminated to the different material portion 403b. Grooves may be processed on the different material portion via a milling process, and the wireless charging coil may be buried in the grooves. However, the present invention is not limited to such exemplary embodiments. In other embodiments, the wireless charging coil may be implemented as a single layer.

A ferrite sheet 412 may be attached to the surface of a battery 441. The battery may include a front surface, a rear surface and side surfaces. The ferrite sheet may include a first ferrite sheet 412a covering a main surface of the battery and a second ferrite sheet 412b mounted on side surfaces of the battery such that the side surfaces face side wall portions 442a of the battery accommodating unit 442.

In some embodiments of the claimed invention, the antenna coil 411 and/or wireless charging coil 421 may be close to but still separated from the ferrite sheet 412. The antenna coil and wireless charging coil may be formed on a battery cover 403 as a thick wire. The thick wire may be composed of a plurality of layers. At least one layer of the wireless charging coil may be buried in the battery cover.

Figure 10:
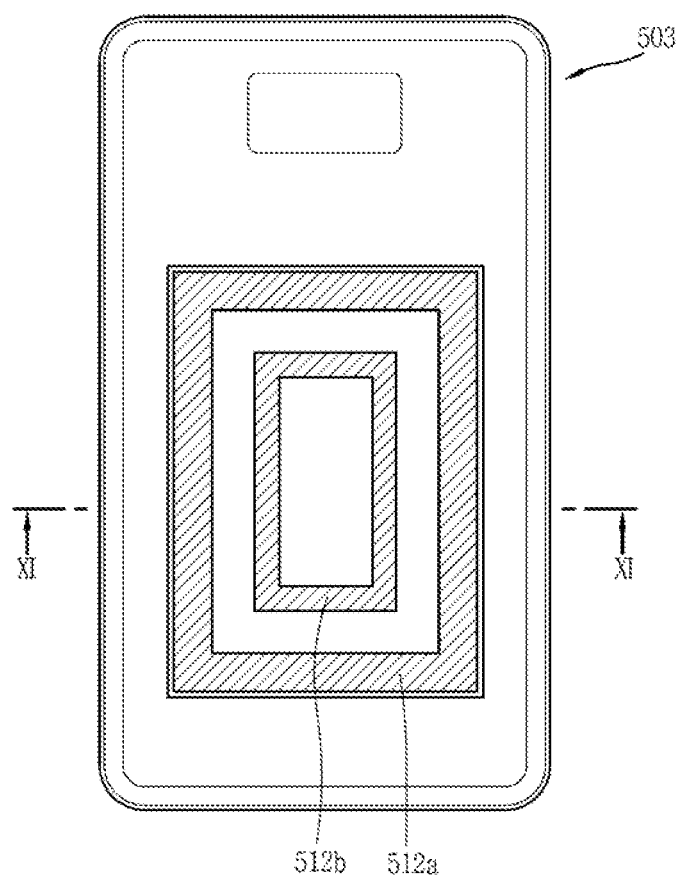
FIG. 10 is a perspective view of a rear surface of yet another exemplary embodiment of the battery cover.
Figure 11:
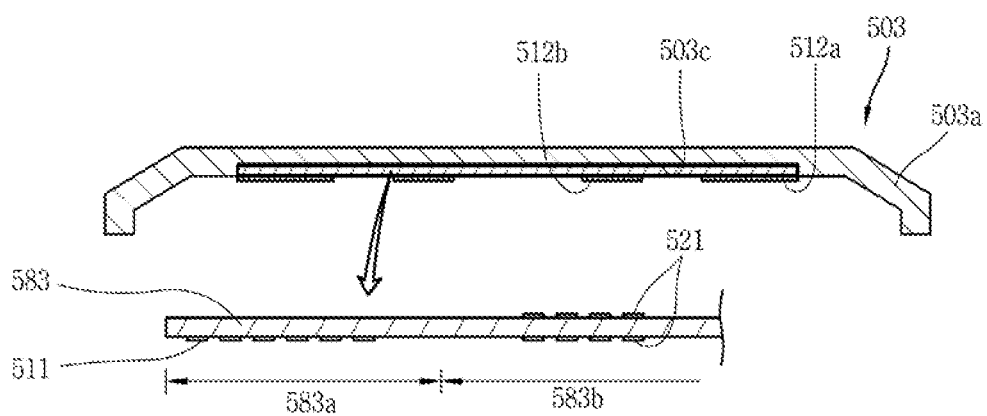
FIG. 11 is a sectional view of the exemplary embodiment of the battery cover shown in FIG. 9 as observed at line XI-XI.

FIG. 10 is a perspective view of a rear surface of yet another exemplary embodiment of the battery cover. FIG. 11 is a sectional view of the exemplary embodiment of the battery cover shown in FIG. 9 as observed at line XI-XI.

With respect to FIGS. 10 and 11, the FPCB 583 may be inserted into the case of the mobile terminal 100. The case 503 may be formed of a single material without the different material portion 403b (see FIG. 4).

For example, the case may comprise a recessed region 503c into which the FPCB 583 is inserted. The recessed region may be formed via insert-molding by inserting the FPCB in a metallic mold (not shown). In some other embodiments, a different material portion may be formed at the case, and the different material portion be comprised of a material having a low melting point, which may reduce its inferiority rate during insert-molding.

With respect to FIGS. 10 and 11, the FPCB 583 may include a first region 583a and a second region 583b. An antenna coil 511 may be configured to detect a change in the magnetic flux at a peripheral portion of the body of the mobile terminal 100. A wireless charging coil 521 configured to generate an induction current for wireless charging may be formed at the second region.

The FPCB 583 may comprise a plurality of layers, and the antenna coil 511 may be formed on one of the plurality of layers. The wireless charging coil 521 may be formed on and/or laminated to at least two layers of the plurality of layers.

In some embodiments of the present invention, the antenna coil 511 may be formed on one surface of the FPCB 583, and the wireless charging coil 521 may be formed on two surfaces of the FPCB. In some embodiments of the claimed invention, different portions of the wireless charging coil may be connected to each other through connections in various holes (not shown). In such embodiments, even if both of the antenna coil and the wireless charging coil are formed at a single FPCB, the area covered by of the wireless charging coil will be sufficient.

In some embodiments of the present invention, the FPCB 583 is buried in the case 503 such that the FPCB is located on a surface of the case where the antenna coil is formed and is exposed to the outside portion of the mobile terminal 100. Such a structure would facilitate an electrical connection between the antenna coil 511 and the FPCB.

In some embodiments of the claimed invention, ferrite sheets 512a, 512b are mounted on the case 503 such that the ferrite sheets cover the antenna coil 511 and/or wireless charging coil 521. The ferrite sheets may include a first ferrite sheet 512a corresponding to the antenna coil and a second ferrite sheet 512b corresponding to the wireless charging coil.

In other embodiments of the claimed invention, the first and second ferrite sheets 512a, 512b may be configured to cover only a part of the antenna coil 511 and/or wireless charging coil 521. In such embodiments, the first and second ferrite sheet may have different transmittances (i.e., penetration ratios). The fabrication costs associated with ferrite sheets with different transmittances may be lower than ferrite sheets with the same transmittance.

The present invention has many advantages, only some of which are described in further detail below. Firstly, the case may be partially-plated because the case can be formed of different materials. Secondly, the antenna coil and/or wireless charging coil may be formed at the case in order to allow the mobile terminal to have low thickness. Thirdly, since the antenna coil and the wireless charging coil are formed at the battery cover, near-field communication and/or wireless charging can be performed through the rear surface of the mobile terminal 100.

The foregoing embodiments and advantages are merely exemplary and are not to be considered as limiting the scope of the present invention. The present disclosure can be readily applied to other types of apparatus. The present disclosure is intended to be illustrative and not to limit the scope of the claims.

Many alternatives, modifications and variations to the present disclosure will be apparent to those skilled in the relevant art. The features, structures, methods and other characteristics of the exemplary embodiments described herein may be combined in various ways to obtain alternative exemplary embodiments that fall within the scope and spirit of the present invention.

What is claimed is:

1. A mobile terminal comprising:
   a case that forms at least a portion of a terminal body and comprises:
      a case body composed of non-plateable synthetic resin;
      a different material portion attached to the case body and formed from plateable synthetic resin;
      an antenna coil formed on a first portion of the different material portion via plating and configured to detect a change in magnetic flux occurring at a periphery of the terminal body; and
      a wireless charging coil located on a second portion of the different material portion and configured to generate an induction current for wireless charging; and
   a battery accommodation portion configured to accommodate a battery,
   wherein the case is configured to cover the battery and the battery accommodation portion when coupled to the terminal body, and
   wherein the antenna coil and the wireless charging coil are arranged on a same surface of the case such that the wireless charging coil is surrounded by the antenna coil.

2. The mobile terminal of claim 1, further comprising:
   grooves arranged in a pattern on the different material portion and corresponding to the antenna coil, wherein the antenna coil is plated in the grooves.

3. The mobile terminal of claim 2, wherein the pattern is created via laser processing.

4. The mobile terminal of claim 2, further comprising:
a recess region formed on a surface of the case body, wherein the different material portion fills the recess region such that the grooves are arranged on an exposed surface of the different material portion.

5. The mobile terminal of claim 1, further comprising at least one ferrite sheet mounted on the case and configured to cover the antenna coil and the wireless charging coil.

6. The mobile terminal of claim 5, wherein the at least one ferrite sheet comprises a single sheet.

7. The mobile terminal of claim 1, wherein the different material portion is mounted on a surface of the case such that the surface of the case faces the battery and is exposed externally.

8. The mobile terminal of claim 1, further comprising:
grooves corresponding to the wireless charging coil, the grooves arranged in a pattern on the different material portion, wherein the wireless charging coil is plated in the grooves.

9. The mobile terminal of claim 8, further comprising:
grooves corresponding to the antenna coil, the grooves arranged in a pattern on the different material portion, wherein the antenna coil is plated in the grooves, and wherein the grooves corresponding to the antenna coil and the grooves corresponding to the wireless charging coil are arranged on a same plane of the different material portion.

10. The mobile terminal of claim 1, wherein the wireless charging coil is located on a flexible printed circuit board (FPCB) that is buried in the different material portion.

11. The mobile terminal of claim 10, wherein:
the FPCB comprises a plurality of layers; and
the wireless charging coil is laminated on each of the plurality of layers.

12. The mobile terminal of claim 10, wherein the case body and the FPCB are integrated with the different material portion via insert-molding.

13. The mobile terminal of claim 1, wherein:
the wireless charging coil comprises a wire;
at least a portion of the wire is formed in the different material portion; and
at least some other portions of the wire are laminated together.

14. A mobile terminal comprising:
a terminal body;
a flexible printed circuit board (FPCB) having a first region and a second region;
an antenna coil formed on the first region and configured to detect a change in magnetic flux occurring at a periphery of the terminal body;
a wireless charging coil formed on the second region and configured to generate an induction current for wireless charging; and
a case that forms at least a portion of the terminal body, wherein the FPCB is inserted into the case,
wherein:
the FPCB comprises a plurality of layers;
the antenna coil is formed on one of the plurality of layers; and
the wireless charging coil is laminated on at least two of the plurality of layers.

15. The mobile terminal of claim 14, wherein the one of the plurality of layers is formed on an external surface of the FPCB such that at least a portion of the antenna coil is exposed to the outside of the case.

16. The mobile terminal of claim 14, further comprising:
a recessed region formed on the case and configured to facilitate insertion of the FPCB into the case.

* * * * *